United States Patent [19]

Kletzl et al.

[11] Patent Number: 4,984,112
[45] Date of Patent: Jan. 8, 1991

[54] RECORDING AND/OR REPRODUCING APPARATUS FOR A RECORD CARRIER IN TAPE FORM

[75] Inventors: Franz Kletzl, Kilb; Winfried Schafler, Korneuburg, both of Austria

[73] Assignee: U. S. Philips Corporation, New York, N.Y.

[21] Appl. No.: 253,275

[22] Filed: Oct. 3, 1988

[30] Foreign Application Priority Data

Dec. 23, 1987 [AT] Austria ............................. 3417/87

[51] Int. Cl.$^5$ ........................................... G11B 5/008
[52] U.S. Cl. ................................................. 360/96.6
[58] Field of Search .................... 360/96.6, 96.5, 96.1, 360/93, 90, 88

[56] References Cited

U.S. PATENT DOCUMENTS

| | | | |
|---|---|---|---|
| 4,050,087 | 9/1977 | Kishi | 360/96.6 |
| 4,072,988 | 2/1978 | Sato et al. | 360/96.6 |
| 4,484,240 | 11/1984 | Yoshida | 360/96.5 |
| 4,578,724 | 3/1986 | Beitler | 360/96.5 X |
| 4,795,109 | 1/1989 | Chung et al. | 360/96.5 X |
| 4,811,138 | 3/1989 | Park | 360/96.5 |

FOREIGN PATENT DOCUMENTS

| | | | |
|---|---|---|---|
| 1233160 | 1/1967 | Fed. Rep. of Germany | 360/96.6 |
| 0020249 | 1/1986 | Japan | 360/96.6 |
| 0032259 | 2/1986 | Japan | 360/96.6 |
| 0149857 | 6/1988 | Japan | 360/96.5 |

Primary Examiner—Robert S. Tupper
Assistant Examiner—Andrew L. Sniezek
Attorney, Agent, or Firm—Brian J. Wieghaus

[57] ABSTRACT

A recording and/or reproducing apparatus for a record carrier in tape form housed in a cassette has a cassette holder which can be swivelled between a load position and an operating position. In the load position, a cassette can be introduced as far as an introduction position in the cassette holder fixed by at least one limiting stop on the cassette holder. At least one pressure mechanism is arranged on a carrier which can swivel between an initial position and a working position and is coupled to the cassette holder. The swivel axis of the carrier is arranged offset parallel to the swivel axis of the cassette holder. The pressure mechanism comes into active connection during the swivelling of the carrier into its working position and of the cassette holder into its operating position, due to the mutual offset of the two swivel axes with a cassette introduced into the cassette holder and presses the cassette into its introduction position.

16 Claims, 3 Drawing Sheets

RECORDING AND/OR REPRODUCING APPARATUS FOR A RECORD CARRIER IN TAPE FORM

BACKGROUND OF THE INVENTION

The invention relates to a recording and/or reproducing apparatus for a record carrier in tape form which is housed in a cassette. The cassette can be inserted into the apparatus and has two adjacent, rotatingly drivable hubs for the same, with rotatingly drivable winding spindles, which can be brought into drive connection with the hubs through at least a first main wall of the cassette for driving of the hubs. The apparatus has a cassette holder, which can be swivelled about a swivel axis, and is essentially designed in tray form and can be swivelled between a load position, which a cassette with a first side wall forwards can be introduced into the cassette holder as an far as introduction position fixed by at least one limiting stop provided on the cassette holder, and an operating position, in which a cassette introduced into the cassette holder assumes an operating position in which the winding spindles are in drive connection with the hubs. The apparatus also has at least one spring-loaded pressure mechanism which, with the cassette holder in its load position, is located outside the introduction area of a cassette and which, during swivelling of the cassette holder into its operating position, comes into active connection with a cassette introduced into the holder. The pressure mechanism acts with at least one point of contact located in the area of the side wall opposite the first side wall, and presses the cassette under the action of the spring acting on the pressure mechanism towards the limiting stop.

Such an apparatus is known from Austrian Patent Specification No. 298,104. In the case of this known apparatus, the pressure mechanism is arranged fixedly within the apparatus, coming into active connection with a cassette introduced into the cassette holder during the swivelling of the cassette into its operating position only immediately before the cassette reaches its operating position. If, in the case of this known apparatus, a cassette is not introduced into the cassette holder by the user properly as far as the introduction position fixed here by two limiting stops on the cassette holder, which can happen for example under unfavorable friction conditions by catching of the cassette, during swivelling of the not properly introduced cassette into its operating position, problems can occur during entry into the cassette of the winding spindles provided for driving the two hubs, because this entry of the two winding spindles already takes place at a time at which the pressure mechanism is not yet interacting with the cassette and the cassette is therefore not yet pressed into its introduction position in the cassette holder and held in the same.

If a cassette has not been properly introduced into its introduction position in the cassette holder, it may even happen that the cassette pushes against the winding spindles with its first main wall, through which the winding spindles can be brought into drive connection with the hubs, the cassette then not being swivelled into its operating position and it therefore not being possible to put the apparatus into operation.

Furthermore, with the known apparatus, the fixedly arranged pressure mechanism comes abruptly into active connection with a cassette introduced into the cassette holder, which may be found disturbing in the manual adjustment of the cassette holder by the user since a resistance is suddenly felt in the movement sequence and this can also lead to an increased wear of both the pressure mechanism and of the cassette.

SUMMARY OF THE INVENTION

The invention is based on the object of avoiding the difficulties mentioned above and of creating a apparatus in which a cassette introduced into the cassette holder is pushed reliably into its introduction position in the cassette holder and held in the same already at a relatively early time in the swivelling operation of the cassette holder into its operating position, and in which an abrupt action of the pressure mechanism on the cassette is avoided. For this purpose, the invention is characterized in that the pressure mechanism is arranged on a carrier which can be swivelled about a swivel axis between an initial position and a working position, in that the carrier is coupled to the cassette holder via at least one coupling mechanism for the at least partially common swivelling of the two, and in that the swivel axis of the carrier is arranged offset parallel to the swivel axis of the cassette holder. The distance of the point of contact provided on the pressure mechanism from the swivel axis of the cassette holder being greater on the one hand, with cassette holder in its load position and carrier thereby in its initial position, and smaller on the other hand, with cassette holder in its operating position, without cassette introduced into it, and carrier thereby in its working position, than the distance of the corresponding point of contact on a cassette introduced into the cassette holder from the swivel axis of the cassette holder. During swivelling of the carrier from its initial position into its working position, the point of contact provided on the pressure mechanism moving towards the corresponding point of contact on a cassette introduced into the cassette holder and thereby coming into action with the same.

By arranging the pressure mechanism on the swivelling carrier and by the mutual offset, as mentioned, of the swivel axes of the cassette holder and of the carrier, during the swivelling of the two into their operating or working position, a relative movement between the pressure mechanism fitted on the carrier and a cassette introduced into the cassette holder is achieved, which, owing to the pressure mechanism also moved during the swivelling of the carrier, already comes into active connection with the cassette at a relatively early time in the swivelling operation. As a result the cassette is reliably pushed into its introduction position in the cassette holder and held in the same already relatively early, even before the swivelling operation has been completed, so that the winding spindles can enter reliably and without any difficulties into the cassette properly located in its introduction position. Furthermore, by the measures according to the invention it is achieved that the pressure mechanism is continuously moved up against a cassette introduced into the cassette holder and thereby gently comes into active connection with the latter, the force applied to the cassette by the spring acting on the pressure mechanism increasing continuously, so that a uniform movement sequence without disturbing retroactive effects noticeable by a user and particularly low wear for the pressure mechanism and the cassette are achieved.

At this point it should be mentioned that an apparatus is known from German Patent Specification No.

2,636,512 in which a carrier which can be swivelled about a swivel axis arranged offset parallel to a swivel axis of the cassette holder and designated here for the opening of cassette covers of a cassette introduced into the cassette holder is coupled with a swivelling cassette holder by a coupling mechanism formed by a pin-slot connection. This apparatus has no pressure mechanism for the pressing of a cassette introduced into the cassette holder towards at least one limiting stop provided on the cassette holder. Rather, in the case of this known apparatus, two fixed pins are arranged on the carrier, with which pins, as mentioned, two cassette covers of a cassette introduced into the cassette holder are opened during the swivelling of the cassette holder into its operating position due to the hereby occurring relative movement achieved by the mutual offset of the swivel axes of the cassette holder and of the carrier. On the other hand, in the case of the apparatus according to the invention, on the carrier there is arranged at least one spring-loaded pressure mechanism, which serves to press a cassette introduced into the cassette holder towards at least one limiting stop provided on the cassette holder. Thus, the apparatus known from German Patent Specification No. 2,636,512 concerns a different apparatus than the apparatus according to the invention both with regard to design features and from a functional point of view, with which accordingly the advantages according to the invention do not exist or cannot be achieved.

For example, in the case of an apparatus according to the invention, the carrier may be arranged adjacent to the first main wall of a cassette introduced into the cassette holder. Also two carriers may be provided for each one pressure mechanism, which may be essentially L-shaped, and be arranged adjacent to one of the two side walls running perpendicular to the first side wall. However, it has proven advantageous if the carrier is arranged essentially adjacent to the main wall, opposite the first main wall, of a cassette introduced into the cassette holder. In this way, a simple, space-saving design is achieved.

In this context, it has proven particularly advantageous if the carrier is designed essentially in the form of a plate and forms a closure cover for a compartment holding the cassette holder in its operating position. As a result, the carrier not only fulfills its carrier function for the pressure mechanism, but also an additional closure function for a compartment for the cassette holder in its operating position, so that a separate closure cover for such a compartment is made superfluous.

With regard to the arrangement of the swivel axis of the carrier, it has proven advantageous if the swivel axis of the carrier has a greater normal distance from the first main wall of a cassette introduced into the cassette holder than the point of contact provided on the pressure mechanism and if a releasable fixing mechanism is provided for the fixing of the carrier in its working position. In this way it is achieved that, with pressure mechanism acting on a cassette introduced into the cassette holder, the force of reaction occurring at the pressure mechanism in response to the spring force of the spring acting on the pressure mechanism results in a turning moment at the carrier which tends to swivel the carrier from its working position into its initial position. Consequently, the spring acting on the pressure mechanism is advantageously not only utilized for supplying the force of the pressure mechanism for the pressing of a cassette introduced into the cassette holder towards at least one limiting stop provided on the cassette holder but additionally also for supplying an adjusting force for the adjustment of the carrier out of its working position into its initial position, as a result of which the swivelling of the cassette holder into its load position and of the carrier into its initial position is assisted by this spring.

In such an apparatus, a releasable detaining mechanism or a swivelling locking lever may be provided for example as fixing mechanism. However, it has proven particularly advantageous if the fixing mechanism for the carrier is formed by a locking slide which can be adjusted perpendicularly to the swivel axis of the carrier and can be adjusted into its locking position under the action of a spring. This has the effect of achieving a particularly simple and operationally reliable design.

The pressure mechanism arranged on the carrier may, for example, just as in the case of the apparatus known from Austrian Patent Specification No. 298,104, mentioned at the beginning, consist of an essentially hemispherical pressure cam fitted on an angled-off leaf spring, the leaf spring being fastened on the carrier. The pressure mechanism may also be formed by a pressure lever swivel-mounted on the carrier. However, it has proven particularly advantageous if the pressure mechanism is formed by a pressure slide displaceably guided on the carrier perpendicular to the swivel axis of the latter. This has the effect of achieving a particularly simple and operationally reliable design in which the pressure mechanism is advantageously adjustable over a relatively large range of travel.

With respect to a precise positioning of a cassette located in its operating position, it has proven advantageous if, with carrier in its working position, a cassette in its operating position is held by the pressure mechanism up against at least one stationary positioning stop on the apparatus, acting on the cassette in the area of the first side wall, the cassette being adjusted against the tray direction out of its introduction position in the cassette holder and thereby held in its operating position, lifted off the limiting stop on the cassette holder. It is achieved in this way that the pressure mechanism not only takes care that a cassette introduced into the cassette holder is reliably pressed into its introduction position in the cassette holder during swivelling of the cassette holder into its operating position and is held in the same during the swivelling of the cassette holder, but that the pressure mechanism additionally also takes care that, following the swivelling of the cassette holder, the cassette assumes a precisely defined operating position which is fixed by the interaction of its first side wall with the stationary positioning stop on the apparatus, as is often usual with such apparatus for the precise positioning of a cassette.

The pressure mechanism arranged on the carrier may be designed in such a way that, with its point of contact acting at the corresponding point of contact on a cassette introduced into the cassette holder, it exerts a force directed exclusively in the tray direction on the side wall opposite the first side wall, as is the case with the apparatus known from Austrian Patent Specification No. 298,104 mentioned at the beginning. With respect to a precise positioning of a cassette in its operating position, it has, however, proven advantageous if the corresponding point of contact on a cassette introduced into the cassette holder is in the edge area of the cassette into which the side wall opposite the first side wall and the main wall opposite the first main wall lead and the point of contact provided on the pressure mechanism is provided on a contact surface of the pressure mechanism running at an angle to the side wall leading into this edge area and to the main wall leading into this edge area and, with carrier in its working position, a cassette in its operating position is held by the pressure mechanism up against at least one stationary bearing surface on the apparatus in the area of its first main wall adjoining the side wall opposite the first side wall. It is achieved in this way that the pressure mechanism not only takes care that a cassette introduced into the cassette holder is reliably pressed into its introduction position in the cassette holder during swivelling of the cassette holder into its operating position and is held in the same during the swivelling of the cassette holder, but that the pressure mechanism additionally also takes care after the swivelling of the cassette holder that the cassette located in its operating position is precisely positioned reliably against the area of its first main wall adjoining the side wall opposite the first side wall, as is likewise often usual with such apparatus for the precise positioning of a cassette. Furthermore, it is thereby achieved that no separate holding-down mechanism is necessary, such as for example, at least one leaf spring fitted on the cassette holder and pressing against the main wall opposite the first main wall for the pressing of the cassette against the stationary bearing surface, which is advantageous with regard to a simple and inexpensive design.

BRIEF DESCRIPTION OF THE DRAWINGS

The invention will be described in more detail below with reference to the drawings, in which an exemplary embodiment of the invention is illustrated, but to which it is not intended that the invention is limited.

DESCRIPTION OF THE PREFERRED EMBODIMENTS

Figure 1:
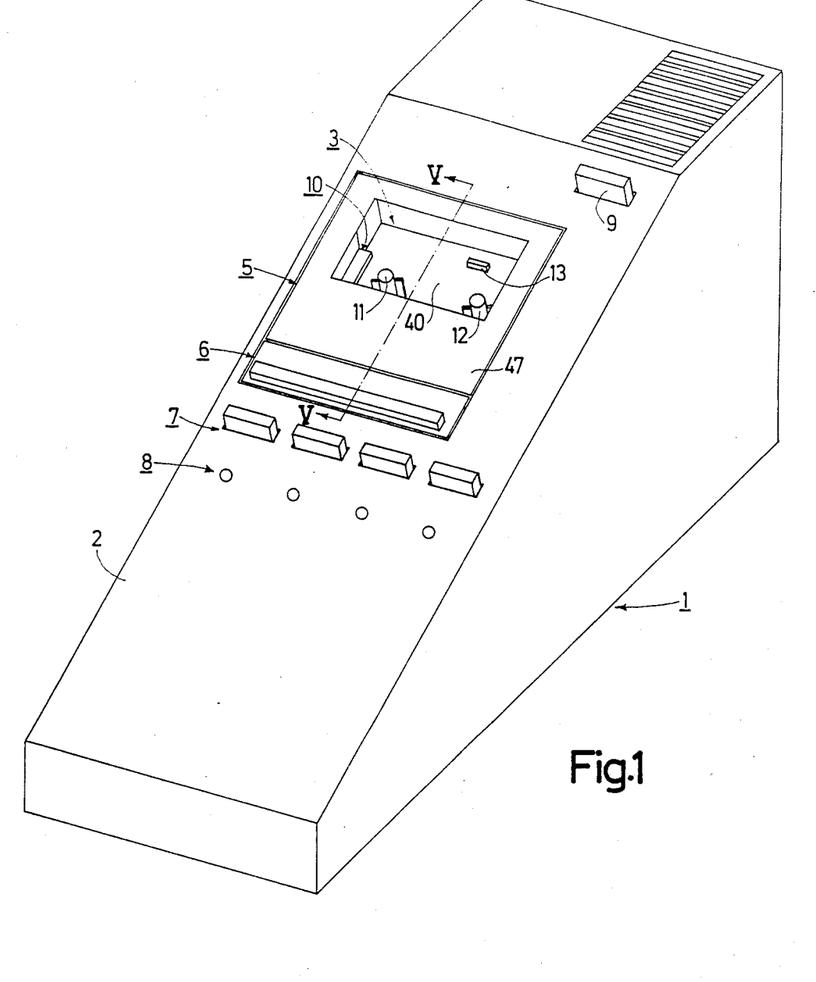
FIG. 1 shows diagrammatically in an angled view a recording and reproducing apparatus for a record carrier in tape form housed in a cassette, which has a swivelling closure cover for the closure of a compartment for a cassette holder.
Figure 2:
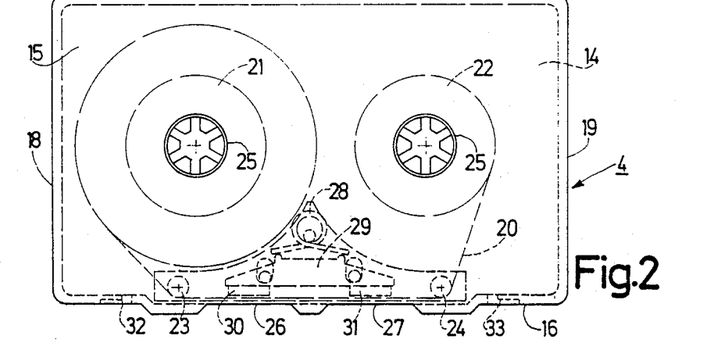
FIG. 2 shows, in plan view, enlarged by a factor of about two, a cassette which can be inserted into the apparatus according to FIG. 1 for the recording and reproducing of sound signals.

FIG. 1 shows a recording and reproducing apparatus 1, which is intended for the recording and reproducing of voice signals and may be referred to as a desktop dictating machine. The apparatus 1 has an inclined cover wall 2, in the area of which a compartment 3 for a cassette holder for the holding of a cassette is provided. Such a cassette 4 is shown in FIG. 2. For the closure of the compartment 3, the apparatus 1 is provided with a swivelling closure cover 5. For the opening of the closure cover 5, the apparatus has a swivelling pushbutton 6 arranged next to the closure cover and extending over its entire width. Furthermore, in the area of the cover wall 2 there is provided a set of buttons 7 with four pushbuttons, by which the operating modes of the apparatus "fast rewind", "stop", "play" and "fast forward" can be activated from left to right in FIG. 1. The pushbuttons of the set of buttons 7 each interact with an electric switching contact, each switching contact emitting a switching signal to a microprocessor provided in the apparatus 1, which microprocessor for its part effects the adjustment of the necessary apparatus components for switching on the desired operating mode, using electromagnets or servo motors actuated by it. As such measures are already known in the case of such apparatus and are not essential in the context of the present invention, a detailed description of the same will be dispensed with. To display which of the previously mentioned operating modes is switched on in the apparatus 1, the said apparatus has a set 8 of light-emitting diodes, which are arranged next to the pushbuttons, each light-emitting diode being assigned to one pushbutton. It should be mentioned that the "record" operating mode can be switched on via the microprocessor mentioned from a microphone which can be connected to the apparatus 1 but this is not shown for the sake of simplicity. Furthermore, provided in the area of the cover wall 2 is another pushbutton 9, which is to be operated in order to set the apparatus 1 in operation in the first place.

As can be seen in FIG. 1, the closure cover 5 of the apparatus 1 has a transparent area through which the compartment 3 can be viewed, there being no cassette in the compartment 3 according to FIG. 1. The compartment 3 contains a swivelling cassette holder 10 for holding a cassette and two winding spindles 11 and 12, which can be motor-driven in a way not shown in any more detail, and a stationary stop 13 for the supporting of a cassette brought into an operating position, for its vertical positioning.

Further details are given briefly below of the right-paralleliped cassette 4 shown in FIG. 2, long known as a dictating cassette. The cassette 4 has a right-paralleliped housing with a first main wall 14, underneath according to FIG. 2, a second main wall 15, on top according to FIG. 2, a long first side wall 16, at the front according to FIG. 2, a long second side wall 17, at the back according to FIG. 2, and two short side walls 18 and 19. In the cassette 4 there is housed a magnetizable record carrier 20 in tape form, which is referred to below for short as magnetic tape. For the winding of the magnetic tape 20, two adjacent, rotatingly drivable hubs 21 and 22 are rotatably mounted in the cassette 4. The magnetic tape 20 is passed from the one hub 21 over a tape guide 23 along the first side wall 16 and a further tape guide 24 to the other hub 22. Since the cassette 4 can be inserted in the apparatus 1 in a known way in two oppositely facing ways, the two winding spindles 11 and 12 for the driving of the hubs 21 and 22 can be brought into drive connection with the hubs 21 and 22 through both main walls 14 and 15 of the cassette. For this, the cassette 4 has on each main wall 14 and 15 two openings which are coaxial to the hubs 21 and 22 and, for the sake of simplicity, are all four denoted by the reference numeral 25. In the area of the first side wall 16, the cassette 4 has two openings 26 and 27 through each of which a magnetic head on the apparatus can be brought into active connection with the magnetic tape 20. For the pressing of the magnetic tape 20 against the magnetic heads, two pressure pads 30 and 31, fastened on a displaceable and swivelling pressure-pad carrier 29 loaded by a leg spring 28 are provided in the cassette 4. Furthermore, the cassette 4 has in the area of its first side wall 16 two positioning openings 32 and 33, into each of which a stationary positioning stop in the apparatus can be introduced in order to position the cassette both vertically and laterally with respect to the magnetic heads.

Figure 3:
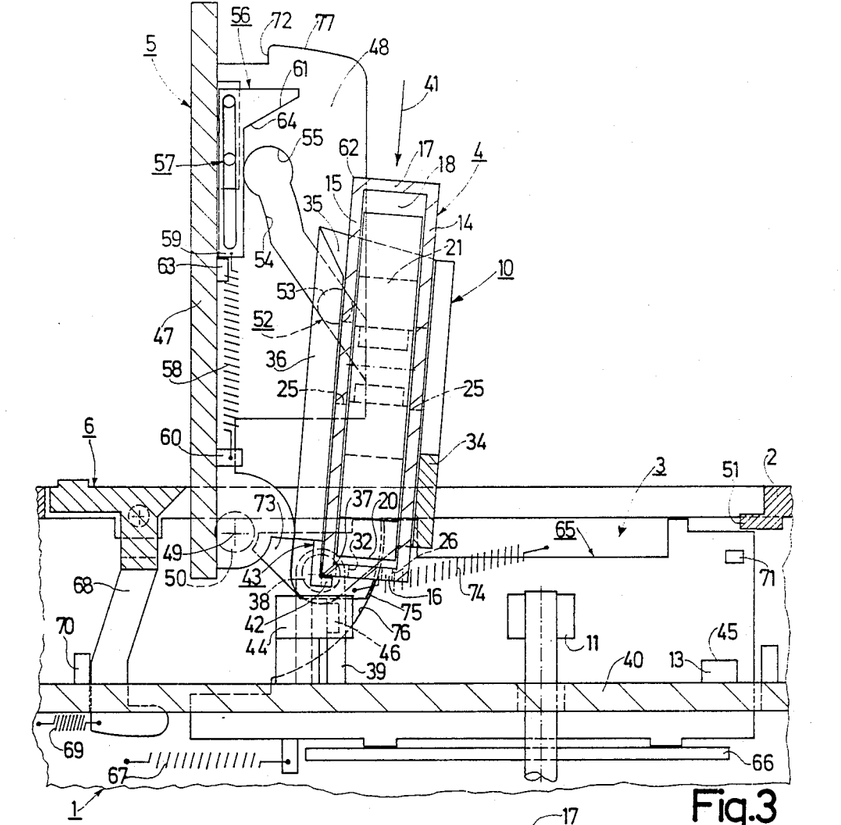
FIG. 3 shows in a diagrammatic way, corresponding to a section along the line V—V in FIG. 1, on a scale enlarged in comparison with FIG. 1, a part of the apparatus according to FIG. 1 which is essential with respect to with the present invention, the closure cover being in its opened position.
Figure 4:
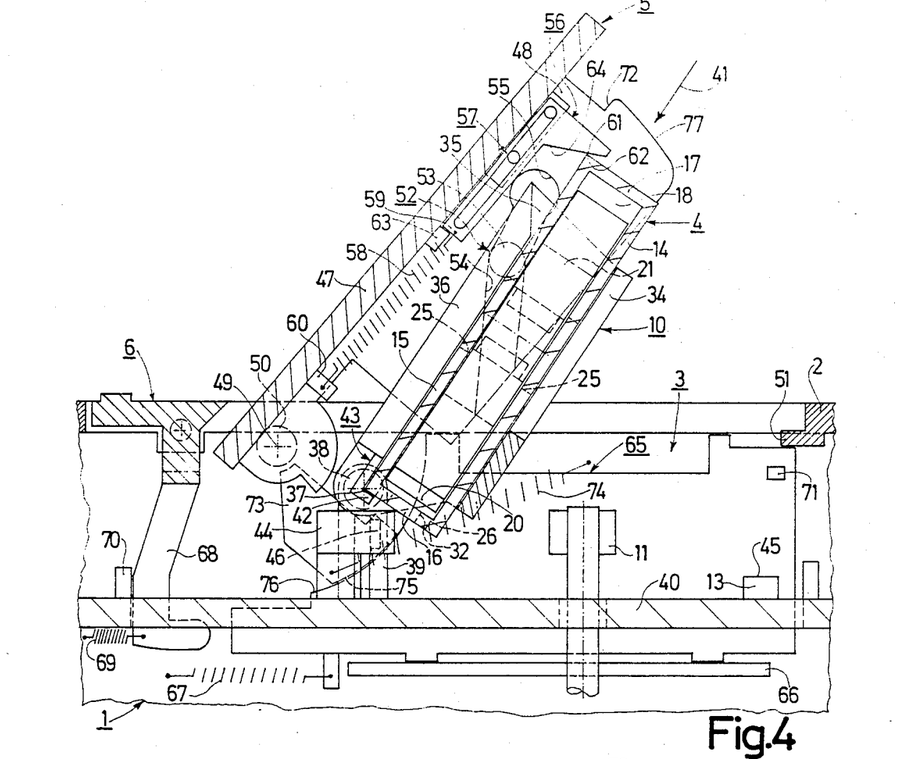
FIG. 4 shows, in analogy with FIG. 3, the part of the apparatus according to FIG. 1 essential to the invention, the closure cover being in an intermediate position between it opened position and its closed position.
Figure 5:
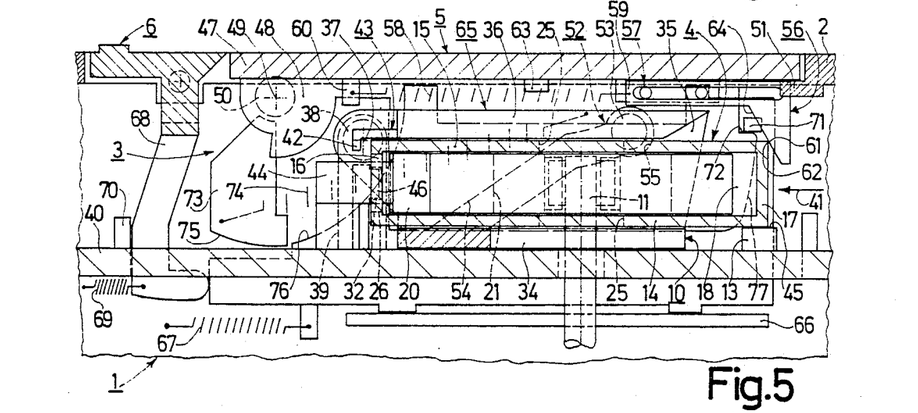
FIG. 5 shows, in analogy with FIG. 3 and 4, in a section along the line V—V in FIG. 1, the part of the apparatus according to FIG. 1 essential to the invention, the closure cover being in its closed position.

As can be seen in FIG. 3 to 5, the cassette holder 10 is designed essentially in the form of a tray and consists of a bottom wall 34 of U-shaped design, two side walls 35 rising from the side pieces of the bottom wall 34 and two cover strips 36 rising from the side walls 35 and pointing towards each other. The side walls 35, and the portions of the bottom wall 34 and lower strips 36 adjacent the side walls function as guided for guiding the cassette during insertion into the holder. The cassette holder 10 can swivel about a swivel axis 37. The swivel axis 37 is fixed by two bearing pins 38 protruding to the outside from the side walls 35, each of which bearing pins is rotatably mounted in a bearing tab 39. The two bearing tabs 39 protrude from a chassis plate 40 limiting the compartment 3. The cassette holder 10 and its swivel bearing are of essentially mirror-symmetrical design with respect to a plane running perpendicular to its bottom wall 34 and in the tray direction, which is specified in FIG. 3 to 5 by an arrow 41, only half of it being visible due to the sectional representation in the FIG. 3 to 5. The cassette holder 10 can be swivelled between a load position represented in FIG. 3 and an operating position represented in FIG. 5.

In the load position represented in FIG. 3, a cassette 4 can be slidably introduced with the first side wall 16 forwards in tray direction 41 into the cassette holder 10 with the other pair of opposing cassette side walls being guided between the holder guidewalls as far as an introduction position fixed by two limiting stops 42 provided on the cassette holder. The limiting stops 42 are in this case formed by the short arms of two L-shaped angles 43, the long arms of which are connected to the cover strips 36 of the cassette holder 10 and protrude from these in tray direction 41. In FIG. 3 and 4, a cassette 4 introduced into the cassette holder 10 is represented in its introduction position.

In the operating position of the cassette holder 10 represented in FIG. 5, a cassette 4 introduced into the cassette holder assumes an operating position which can be seen in FIG. 5. In this operating position of the cassette, the winding spindles 11 and 12 are in drive connection with the hubs 21 and 22 through the first main wall 14 of the cassette 4. Furthermore, the magnetic heads of the apparatus 1, of which only one magnetic head 44 is visible in FIG. 3 to 5, are in contact with the magnetic tape 20 through the openings 26 and 27 in the first side wall 16 of the cassette 4, the magnetic tape 20 being pressed by the pressure pads 30 and 31 against the magnetic heads. The magnetic heads are adjustably fastened to the chassis plate 40, which is not shown in detail in FIG. 3 to 5 for the sake of simplicity. In the operating position of the cassette 4, the latter rests in the area of the first main wall 14, which adjoins the second side wall 17 opposite the first side wall 16, against the stationary stop 13 provided on the chassis plate 40 of the apparatus, the top surface 45 of which stop forms a stop surface for the cassette 4 for the vertical positioning of the same, which acts on the cassette 4 in the area of the first main wall 14 adjoining the second side wall 17. Furthermore, the cassette 4 in its operating position rests against two stationary positioning stops 46 protruding from the chassis plate 40 and acting against the cassette 4 in the area of the first side wall 16, the positioning stops 46 being introduced into the positioning openings 32 and 33 provided for this in the first side wall 16. The cassette 4 is hereby adjusted against the tray direction 41 out of its introduction position in the cassette holder 10 and thereby held in its operating position, lifted off the limiting stops 42 on the cassette holder 10. The distance between the introduction position and the operating position of the cassette is actually about 0.2 mm; for the sake of clarity, this distance is shown as somewhat larger in FIG. 5.

As can also be seen in FIG. 3 to 5, the swivelling closure cover 5 is arranged essentially adjacent to the second main wall 15 opposite the first main wall 14 of a cassette 4 introduced into the cassette holder 10. The closure cover 5 is designed essentially in the form of a plate. It consists of a rectangular cover plate 47, provided for the closing of the compartment 3, and two side plates 48 opposite the side walls 35 of the cassette holder 10. The closure cover 5 can be swivelled about a swivel axis 49, which is fixed by two bearing pins 50 protruding outwards from the side plates 48, which bearing pins are rotatably mounted in the housing walls of the apparatus 1. The closure cover 5 and its swivel bearing are designed mirror-symmetrically in analogy with the cassette holder 10, only half of it being visible due to the sectional representation in FIG. 3 to 5. The closure cover 5 can be swivelled between an opened position represented in FIG. 3 and a closed position represented in FIG. 5. The swivelling in the direction of the closed position is limited by a stop strip 51 protruding from the cover wall 2 of the housing of the apparatus. The swivelling in the direction of the opened position is limited by a stop, not shown due to the sectional representation.

The closure cover 5 is coupled to the cassette holder 10 for the common swivelling of the two, via two coupling mechanisms 52. The coupling mechanisms 52 are formed in a particularly simple way by two pin-slot connections. The pin-slot connections 52 each have a pin 53 projecting outwards from the side walls 35 of the cassette holder 10 and each has a slot 54 provided in the side plates 48 of the closure cover 5, in which slot the pin 53 can slide with slight play. The slots 54 have an angled-off profile and a circular extension 55 at their closed ends, in which extension the pins 53 are exposed by the slots 54, so that, with pins in the extensions 55, the position of the cassette holder 10 can be fixed relatively independently of the position of the closure cover 5. The pin-slot connections 52 are designed by the previously mentioned choice of the profile of the slots 54 in such a way that the closure cover 5 can swivel between its opened position and its closed position by a swivelling range which is of a different size to that of the swivelling range of the cassette holder 10 between its load position and its operating position. With the present apparatus, the swivelling range of the closure cover 5 is greater than that of the cassette holder 10, so that the closure cover assumes a greater distance from the cassette holder in its opened position than in its closed position. The coupling mechanisms may also be designed differently, for example as lever mechanisms. A coupling mechanisms may also be of releasable design and have a stop surface on the cassette holder and a further stop surface on the closure cover, the two stop surfaces coming into mutual contact during the swivelling of the closure cover into its closed position and of the cassette holder into its operating position.

The closure cover 5 is not only provided for the closing of the compartment 3, but additionally forms a carrier, which can swivel between an initial position and a working position, for two adjustable pressure mechanisms 56 arranged mirror-symmetrically on it, the opened position of the closure cover represented in FIG. 3 corresponding to the initial position and the closed position of the closure cover represented in FIG. 5 corresponding to the working position. Of the two pressure mechanisms 56, only one in visible in FIG. 3 to 5 due to the sectional representation. Each pressure mechanism 56 is formed by a pressure slide displaceably guided on the closure cover 5 perpendicular to its swivel axis 49 with a pin-slot connection 57. The pressure slides may also be displaceably guided in another way, for example with guide strips sliding in guide grooves. Each of the two pressure slides 56 is under the effect of a tension spring 58, which acts on the one hand at one end 59 of the pressure slide and on the other hand at a continuation 60 protruding from the cover plate 47 of the closure cover 5. On each pressure slide 56 there is provided a point of contact 61, with which the pressure slide 56 acts on a point of contact 62 on the cassette 4 corresponding to the first point of contact in the area of the second side wall 17 opposite the first side wall 16, when the pressure slide 56 is in active connection with the cassette 4.

As can be seen in FIG. 3, with cassette holder 10 in its load position and closure cover 5 thereby in its opened position, due to the greater swivel range of the closure cover, the pressure slides 56 are outside the introduction area of a 4 into the cassette holder 10. In this case, the pressure slides 56 assume a rest position, in which they each bear against a stop 63 provided on the closure cover 5 under the action of the tension springs 58 acting on them.

The swivel axis 49 of the closure cover 5 is arranged offset parallel to the swivel axis 37 of the cassette holder 10. The offset of the swivel axes 37 and 49 of the cassette holder 10 and of the closure cover 5 with respect to each other and the rest position of the pressure slides 56 on the closure cover 5 is chosen in such a way that the distance of the point of contact 61 provided on each pressure slide 56 from the swivel axis 37 of the cassette holder 10 is greater on the one hand, with cassette holder 10 in its load position and closure cover 5 thereby in its opened position, the pressure slides 56 being in their rest position, and is smaller on the other hand, with cassette holder 10 in its operating position, without cassette introduced into it, and closure cover 5 thereby in its closed position, the pressure slides 56 likewise being in their rest position, than the distance of the point of contact 62 on the cassette 4 introduced into the cassette holder 10 corresponding to the point of contact 61 provided on each pressure slide 56 from the swivel axis 38 of the cassette holder 10. As can be seen in FIG. 5, the offset is arranged here in the case of the present apparatus in such a way that, with cassette holder 10 in its operating position, and closure cover 5 thereby in its closed position, the normal distance of the swivel axis 49 of the closure cover 5 from the second side wall 17 of a cassette 4 introduced into the cassette holder 10 is greater than the normal distance of the swivel axis 37 of the cassette holder 10 from the second side wall 17.

During the common swivelling of the closure cover 5 from its opened position into its closed position and of the cassette holder 10 from its load position into its operating position, owing to the chosen offset of their two swivel axes 49 and 37 with respect to each other, the points of contact 61 provided on the pressure slides 56 move at the beginning of the adjustment movement continuously towards the corresponding points of contact 62 on the cassette 4 introduced into the cassette holder and thereby come up against the same in a gentle way, as is shown in FIG. 4. Consequently, in the previously mentioned swivelling of the closure cover 5 and of the cassette holder 10, the pressure slides 56 come into active connection with the introduced cassette 4, the introduced cassette being pressed in tray direction 41 towards the limiting stops 42 under the action of the tension springs 58 which act on the pressure slides 56 and are increasingly tensioned continuously after the contact of the pressure slides 56 against the cassette 4. It is ensured in this way that a cassette 4 is pressed reliably by the pressure slides 56 into its introduction position and is held therein even if it has not been introduced into the cassette holder 10 by the user fully into its introduction position. As can be seen in FIG. 4, the pressing of a cassette 4 towards the limiting stops 42 already takes place from a time at which the winding spindles 11 and 12 have not yet entered the cassette 4, so that even from this time the cassette 4 is pressed by the pressure slides 56 reliably into its introduction position in the cassette holder 10 and is held therein. It is achieved in this way that the winding spindles 11 and 12 can enter reliably and without any difficulties into the cassette 4. Owing to the continuous approachment of the pressure slides 56 up against the cassette 4, the pressure slides gently come into active connection with the cassette 4, which is advantageous with regard to low wear of the pressure slides 56 and of the cassette 4. Due to the continuously increasing tension of the tension springs 58, once the pressure slides 56 have come into active connection with the cassette 4, it is achieved that no abrupt resistance found disturbing for a user of the apparatus closing the closure cover 5 manually can be felt and the closure cover 5 can be adjusted into its closed position without disturbing retroactive effects.

The corresponding points of contact 62 on the cassette 4 introduced into the cassette holder 10 are essentially opposite the positioning openings 32 and 33 on the first side wall 16 of the cassette 4. As can be seen from FIG. 4 and 5, the corresponding points of contact 62 are in the edge area of the cassette 4, into which the second side wall 17 opposite the first side wall 16 and the second main wall 15 opposite the first main wall 14 lead. The points of contact 61 provided on the pressure slides 56 are provided on a contact surface 64 of the pressure slides 56 running at an angle to the second side wall 17 leading into this edge area and to the second main wall 15 leading into this edge area. Owing to this choice of the points of contact 61 and 62 it is achieved that, with closure cover 5 in its closed position, the pressure slides 56 exert both a force component in the tray direction 41 and perpendicularly to the tray direction 41 on the cassette in its operating position. It is achieved in this way that, with closure cover 5 in its closed position, the cassette 4, hereby in its operating position, is held by the pressure slides 56 up against the two stationary positioning stops 46 protruding from the chassis plate 40, acting on the cassette 4 in the area of the first side wall 16 and thereby introduced into the positioning openings 32 and 33, the cassette 4 being adjusted, as already mentioned, against the tray direction 41 out of its introduction position in the cassette holder 10 and held in its operating position, lifted off the limiting stops 42 on the cassette holder 10. Furthermore, it is achieved in this way that, with closure cover 5 in its closed position, the cassette 4 in its operating position is held by the pressure slides 56 in the area of the first main wall 14 adjoining the second side wall 17 up against the stationary bearing surface 45 of the stop 13 provided on the chassis plate 40 of the apparatus 1 and acting on the cassette 4 in the area of the first main wall 14. The pressing of the cassette 4 against the positioning stops 46 and against the stop 13, explained above, has the effect that the cassette 4 is reliably positioned exactly in its operating position, as a result of which a satisfactory recording and reproducing of voice signals on the magnetic tape housed in the cassette by means of the magnetic heads is ensured.

With regard to the offset of the swivel axis 49 of the closure cover 5 and of the swivel axis 37 of the cassette holder 10 with respect to each other, it should also be mentioned that, in the case of the present apparatus, the offset of the swivel axes 49 and 37 with respect to each other is chosen in such a way that the swivel axis 49 of the closure cover 5 has a greater normal distance from the first main wall 14 of a cassette 4 introduced into the cassette holder 10 than the points of contact 61 provided on the pressure slides 56 from the first main wall 14. It is achieved in this way that, with pressure slides 56 acting on the cassette 4 introduced into the cassette holder 10, the said slides being adjusted out of their rest position and the tension springs 58 tensioned, a force of reaction is exerted by the cassette 4 on each pressure slide 56, which force results in a turning moment at the closure cover 5 which tends to open the closure cover 5. Consequently, the tensioned tension springs 58 supply an adjusting force which assists the opening of the cassette cover 5 and the swivelling of the cassette holder 10 into its load position.

For the fixing of the closure cover 5 in its closed position against the adjusting forces acting on it, a releasable fixing mechanism 65 is provided. The fixing mechanism is formed by a locking slide which can be adjusted perpendicularly to the swivel axis 49 of the closure cover 5. The locking slide 65 is guided displaceably between the cover wall 2 of the housing of the apparatus and a guide strip 66 between a release position represented in FIG. 3 and 4 and a locking position represented in FIG. 5, the locking slide 65 being adjustable into its locking position under the action of a tension spring 67 acting on it. The adjustment of the locking slide 65 out of its locking position into its release position, and consequently the opening of the closure cover 5 is served by the pushbutton 6, which has an angle-off continuation 68, on which a restoring spring 69 acts, which holds the continuation 68 against a stop 70 protruding from the chassis plate 40 and the free end of which is provided for interaction with the end opposite it of the locking slide 65. The locking slide 65 bears in the area of its other end a locking continuation 71 which protrudes laterally from it and, with closure cover 5 in its closed position and locking slide 65 in its locking position, engages behind a locking shoulder 72 which is provided on each side plate 48 of the closure cover 5, which can be seen in FIG. 3 to 5. In this way, the closure cover 5 is reliably fixed in its closed position. The cassette holder 10 is thereby reliably fixed in its operating position by the fact that a cassette 4 introduced into the cassette holder 10 is pressed down against the stop 13 by the pressure slides 56 arranged on the fixed closure cover 5, the cassette 4 fixing the cassette holder 10 via the U-shaped bottom wall 34. If there is no cassette in the cassette holder 10, with closed closure cover 5, the cassette holder 10 is fixed by the latter via the pin-slot connections 52, although it is then no longer in its operating position due to the circular extensions 55 of the slots 54, which is however irrelevant in this case. It should be mentioned at this point that, with opened closure cover 5, the cassette holder 10 is fixed by the latter via the pin-slot connections 52 in its load position according to FIG. 3.

On the outside of each side plate 48 of the closure cover 5 remote from the cassette holder 10, which can be seen in FIG. 3 to 5, a tab 73 is provided, connected to the said side plate and protruding from the closure cover 5 perpendicularly to the swivel axis 49 of the same, against which tab a tension spring 74 acts, which serves to adjust the closure cover 5 into its completely opened position. The free end 75 of the tab 73 has an arcuate profile coaxial to the swivel axis 49 of the closure cover 5. The locking slide 65 has an arcuate control surface 76 which corresponds to the arcuate end 75 of the tab 73 and via which, with closure cover 5 in its opened position and via and, with swivelling of the closure cover 5 into its closed position, the locking slide 65 is blocked by the arcuate end 75 of the tab 73 in its release position. In the swivelling of the closure cover 5 into its closed position, the arcuate end 75 of the tab 73 only comes out of active connection with the arcuate control surface 76 of the locking slide 64 before reaching its closed position and releases the locking slide 65 for the adjustment into its locking position under the action of the tension spring 67. It is achieved in this way that the position of the locking slide 65, and consequently the function of the same, is controlled dependently on the position of the closure cover 5, so that the locking slide 65 can only come into action if the closure cover 5 is adjusted into its closed position. Furthermore, this has the effect of achieving that, with closure cover 5 adjusted out of its closed position, the locking slide 65 remains held adjusted in its release position, it also being possible to use the locking slide 65 in its release position for the control of further apparatus components which are to be disabled by opening the closure cover 5 and are to remain disabled with opened closure cover.

On each side plate 48 of the closure cover 5, which can be seen in FIG. 3 to 5, a stop surface 77 passing over into the locking shoulder 72 is provided, which stop surface has an arcuate profile coaxial to the swivel axis 49 of the closure cover 5. The locking continuation 71 of the locking slide 65 bears against this stop surface 77 under the action of the tension spring 67 acting on the locking slide, once the arcuate end 75 of the tab 73 has come out of active connection with the arcuate control surface 76 of the locking slide 65 before reaching the closed position of the closure cover 5. In this way, a satisfactory function of the fixing mechanism formed by the locking slide 65 is ensured because the locking continuation 71 is reliably passed from the stop surface 77 over onto the adjoining locking shoulder 72.

What is claimed is:

1. A recording and/or reproducing apparatus for a tape cassette having two major walls, two pair of opposing side walls, and a pair of reel hubs rotatably disposed between said major walls, said apparatus having
- a pair of winding spindles for receiving the reel hubs of a tape cassette,
- a cassette holder for holding a tape cassette, said holder being pivotable about a holder pivot axis between a load position in which a tape cassette is insertable in said holder and an operating position in which the reel hubs of a tape cassette loaded in said holder are engaged by said winding spindles, said holder having a limit stop arranged for engaging a first side wall of the cassette for limiting the insertion of a cassette loaded in said holder; and
- a pressure mechanism for engaging said cassette during the pivoting of said cassette holder from said load position to said operating position to urge said cassette against said limit stop, said pressure mechanism being positioned out of engagement with a cassette in the load position of said holder, the improvement comprising:
- a pivotable carrier pivotable about a carrier pivot axis between an initial position and a working position, said carrier pivot axis being parallel to and offset from said holder pivot axis,
- means for coupling said carrier to said cassette holder such that said carrier and cassette holder pivot in unison over at least a partial range between said load and operating positions of said holder; and
- said pressure mechanism being arranged on said carrier and said carrier pivot axis being offset from said holder pivot axis such that said pressure mechanism moves towards and engages a cassette inserted in said holder as said cassette holder is pivoted from said load position to said operating position to urge the cassette against said limit stop.

2. An apparatus as claimed in claim 1, wherein the cassette holder has guide means formed for holding and guiding opposing side walls of a cassette such that the cassette is slidably insertable into said holder with a pair of opposing side walls guided between said holder guide means, said holder limit stop acting on a first side wall of the other pair of opposing cassette side walls, and
said carrier being arranged adjacent the side of the cassette holder furthest from said winding spindles.

3. Apparatus according to claim 2, wherein the carrier is designed essentially in the form of a plate and forms a closure cover for a compartment holding the cassette holder in its operating position.

4. An apparatus as claimed in claim 3, wherein, in the operating position of said holder with a cassette inserted in the holder, the carrier pivot axis is offset from a first major wall of the cassette through which the winding spindles are inserted, in a direction normal to the cassette holder, a distance greater than the distance between the point of contact between the pressure mechanism and a cassette loaded in said holder and said first major cassette wall such that a turning moment on said carrier from the force of reaction of the pressure mechanism on the cassette tends to pivot the carrier from the working position to its initial position; and
a releasable fixing mechanism is provided for fixing the carrier in its working position.

5. Apparatus according to claim 4, wherein the fixing mechanism for the carrier comprises a locking slide slidable perpendicularly to the carrier pivot axis and a spring for biasing the slide into a locking position for fixing the carrier in the working position.

6. Apparatus according to claim 5 wherein the pressure mechanism comprises a pressure slide displaceably guided on the carrier perpendicular to the carrier pivot axis.

7. An apparatus as claimed in claim 6, further comprising a first stationary bearing surface arranged such that a cassette loaded in said holder is lifted off the limit stop in the cassette holder by said first stationary bearing surface as the cassette holder is pivoted into said operating position, and in said operating position said pressure mechanism urging said cassette first side wall against said first stationary bearing surface, said cassette being displaced from said limit stop on said cassette holder.

8. An apparatus as claimed in claim 7, wherein said apparatus has a second stationary bearing surface arranged at the area of the cassette major wall through which the winding spindles are inserted and adjacent said second side wall in the operating position of the cassette holder, and
said pressure mechanism slide is arranged for contacting a cassette loaded in said holder at a second side wall opposite said first side wall, said slide being angled for contacting said cassette at the cassette edge between the other major wall of the cassette and said second side wall,
said angled slide urging said cassette against said second stationary bearing surface.

9. An apparatus as claimed in claim 2, wherein, in the operating position of said holder with a cassette inserted in the holder, the carrier pivot axis is offset from a first major wall of the cassette through which the winding spindles are inserted, in a direction normal to the cassette holder, a distance greater than the distance between the point of contact between the pressure mechanism and a cassette loaded in said holder and said first major cassette wall such that a turning moment on said carrier from the force of reaction of the pressure mechanism on the cassette tends to pivot the carrier from the working position to its initial position; and
a releasable fixing mechanism is provided for fixing the carrier in its working position.

10. Apparatus according to claim 9, wherein the fixing mechanism for the carrier comprises a locking slide slidable perpendicularly to the carrier pivot axis and a spring for biasing the slide into a locking position for fixing the carrier in the working position.

11. An apparatus as claimed in claim 1, wherein, in the operating position of said holder with cassette inserted in the holder, the carrier pivot axis is offset from a first major wall of the cassette through which the winding spindles are inserted, in a direction normal to the cassette holder, a distance greater than the distance between the point of contact between the pressure mechanism and a cassette loaded in said holder, and said first major cassette wall such that a turning moment on said carrier from the force of reaction of the pressure mechanism on the cassette tends to pivot the carrier from the working position to its initial position; and
a releasable fixing mechanism is provided for fixing the carrier in its working position.

12. Apparatus according to claim 1, wherein the pressure mechanism is formed by a pressure slide displaceably guided on the carrier perpendicular to the swivel axis of the latter.

13. An apparatus as claimed in claim 12, further comprising a first stationary bearing surface arranged such that a cassette loaded in said holder is lifted off said limit stop in the cassette holder by said first stationary bearing surface as the cassette holder is pivoted into said operating position, and in said holder operating position said pressure mechanism urging said cassette first side wall against said first stationary bearing surface, said cassette being displaced from said limit stop on said cassette holder.

14. An apparatus as claimed in claim 13, wherein said apparatus has a second stationary bearing surface arranged at the area of the cassette major wall through which the winding spindles are inserted and adjacent said second side wall in the operating position of the cassette holder, and     said pressure mechanism slide is arranged for contacting a cassette loaded in said holder at a second side wall opposite said first side wall, said slide being angled for contacting said cassette at the cassette edge between the other major wall of the cassette and said second side wall,     said angled slide urging said cassette against said second stationary bearing surface.

15. An apparatus as claimed in claim 1, further comprising a first stationary bearing surface arranged such that a cassette loaded in said holder is lifted off said limit stop in the cassette holder by said first stationary bearing surface as the cassette holder is pivoted into said operating position, and in said holder operating position said pressure mechanism urging said cassette first side wall against said first stationary bearing surface, said cassette being displaced from said limiting stop on said cassette holder.

16. An apparatus as claimed in claim 15, wherein said apparatus has a second stationary bearing surface arranged at the area of the cassette major wall through which the winding spindles are inserted and adjacent said second side wall in the operating position of the cassette holder, and     said pressure mechanism is arranged for contacting a cassette loaded in said holder at a second side wall opposite said first side wall, said pressure mechanism comprising a slide displaceably guided on the carrier perpendicular to the carrier pivot axis, said slide being angled for contacting said cassette at the cassette edge between the other cassette major wall and said second side wall,     said angled slide urging said cassette against said second stationary bearing surface.

* * * * *